Figure 1:
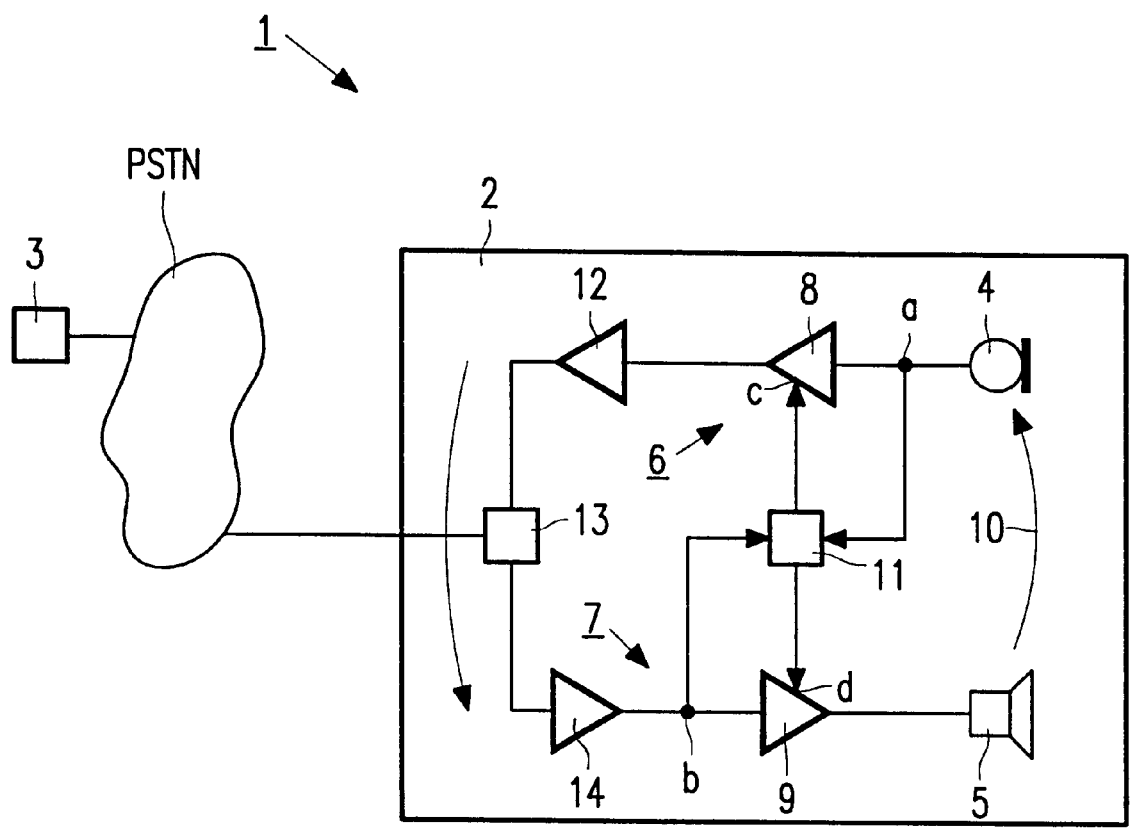

United States Patent

Rijnberg et al.

[11] Patent Number: 5,933,493
[45] Date of Patent: Aug. 3, 1999

[54] TELECOMMUNICATIONS SYSTEM, A SUBSCRIBER UNIT, AND A TELEVISION SET COMPRISING A SUBSCRIBER UNIT

[75] Inventors: Adriaan J. Rijnberg; Paul A.C. Beijer, both of Eindhoven, Netherlands

[73] Assignee: U.S. Philips Corporation, New York, N.Y.

[21] Appl. No.: 08/940,596

[22] Filed: Sep. 30, 1997

[30] Foreign Application Priority Data

Oct. 4, 1996 [EP] European Pat. Off. .............. 96202777

[51] Int. Cl.⁶ .................................................. H04M 1/00
[52] U.S. Cl. .......................... 379/389; 379/390; 379/388
[58] Field of Search .................................. 379/388, 389, 379/390, 387

[56] References Cited

U.S. PATENT DOCUMENTS

| | | | |
|---|---|---|---|
| 3,889,059 | 6/1975 | Thompson et al. | 379/390 |
| 3,909,548 | 9/1975 | Jacobson | 379/389 |
| 4,319,086 | 3/1982 | Thompson | 379/389 |
| 4,490,582 | 12/1984 | Munson | 379/390 |
| 4,580,013 | 4/1986 | Moisin | 379/388 |
| 4,700,382 | 10/1987 | Means et al. | 379/390 |
| 4,720,856 | 1/1988 | Pace et al. | 379/390 |
| 4,724,540 | 2/1988 | Pace et al. | 379/389 |
| 4,879,745 | 11/1989 | Arbel | 379/389 |
| 5,099,472 | 3/1992 | Townsend et al. | 370/291 |
| 5,430,796 | 7/1995 | Komoda et al. | 379/389 |
| 5,490,208 | 2/1996 | Remillard | 379/93.19 |
| 5,544,242 | 8/1996 | Robinson | 379/390 |
| 5,692,042 | 11/1997 | Sacca | 379/387 |

OTHER PUBLICATIONS

Philips Application handbook 1995, "Wirebound Telecom", Nov. 1994, pp. II–263 to II–300.
Speech/transmission circuits, Application of the speech-transmission circuit 1064, Nov. 1994, pp. II–69 to II–74 and II–123.

*Primary Examiner*—Reinhard J. Eisenzopf
*Assistant Examiner*—Charles N. Appiah

[57] ABSTRACT

Known is a telecommunications system comprising a near end and a far end subscriber unit communicating with each other via a transmission channel, at least the near end subscriber being arranged for handsfree communication. In the known system, the near end subscriber unit comprises a duplex controller controlling the near end subscriber unit to three stable modes, a transmit mode, a receive mode, and an idle mode. The known subsciber unit operates in half-duplex mode and has speech and noise detectors for the transmit and receive paths, and a speech level comparator controlling the mode switching. At mode switching, suitable gain adaptation is done in the transmit and receive path so as to prevent howling in handsfree mode. The known duplex controller does not operate satisfactorily if the near end speaker is at a relatively large distance from the microphone. A telecommunications system is provided that satisfactorily operates when the near end speaker is a relatively large distance from the microphone. Time constants of the system are influenced when the far end speaker stops talking and the near end speaker takes over such that no speech loss occurs at the far end.

6 Claims, 2 Drawing Sheets

TELECOMMUNICATIONS SYSTEM, A SUBSCRIBER UNIT, AND A TELEVISION SET COMPRISING A SUBSCRIBER UNIT

The present invention relates to a telecommunications system comprising a near end subscriber unit arranged for handsfree communication with a far end subscriber unit via a transmission channel, at least the near end subscriber unit comprising a transmit path with a microphone and a microphone amplifier and a receive path with a loudspeaker amplifier and a loudspeaker, a duplex controller having signal detection means for detecting signals from the near and far end subscriber units, and a voice switch for switching over the subscriber unit to one of at least three operating modes including a transmit mode, a receive mode, and an idle mode, in dependence of output signals of the speech detection means, a receive path gain being reduced during the transmit mode, a transmit path gain being reduced during the receive mode, and both the transmit and receive path gains being reduced during the idle mode, whereby the near end subscriber unit further comprises control means for controlling the voice switch such that an idling time that the near end subscriber unit is in the idle mode is substantially greater than switching over times from the transmit or receive mode. Such a telecommunications system can be a wired telephony or cordless telephony system in which the subscriber unit can be a handsfree wired telephone set, a base station of cordless having handsfree functionality, or a personal computer or a television set provided with a telephone card with handsfree functionality, or the like. In the case of a television set, the audio system of the television set can be used for implementing the loudspeaking function of the handsfree functionality whereas a microphone has to be added for transmitting speech.

The present invention further relates to a subscriber unit for use in such a telecommunications system.

A telecommunications system and subscriber unit of the above kind are known from the Philips Applications Handbook 1995, "Wirebound telecom", November 1994, pp. II-265 to II-268, pp. II-275 to II-280, p. II-294, and p. II-298. On page II-265, a blockdiagram is disclosed showing the principle of a handsfree telephone set. The telephone set comprises a handsfree circuit TEA1094 coupled to a transmission circuit TEA106x, the latter being coupled to a telephone line. This set is a near end set for handsfree communication with a far end set at the other side of the telephone line. Shown is a closed loop formed via a transmit path with a microphone and a microphone amplifier, a further amplifier in the tranmit path, an anti side-tone network, an amplifier in a receive path, a loudspeaker amplifier, a loudspeaker, and acoustic coupling between the loudspeaker and the microphone. Further shown is a duplex controller controlling the microphone amplifier and the loudspeaker amplifier such that a loop gain of the closed loop is always substantially smaller than one so as to prevent howling. As shown on page II-266, the duplex controller monitors signal and noise of both the transmit and receive path in order to determine the path carrying the largest signal and the duplex controller reduces the gain of the channel containing the smallest signal such that the sum of the transmit gain and the receive gain is constant. Three stable modes are distinguished, a transmit mode in which the transmit gain is set to maximum and the receive gain is set to minumum, a receive mode in which a transmit gain is set to minumum and the receive gain is set to maximum, and an idle mode in which both receive gain and transmit gain are reduced. The difference between the maximum gain and the minimum gain is the switching range of the duplex controller. For switching to the different modes, the duplex controller comprises a voice switch which is controlled by a logic circuit. At input side, the logic circuit is coupled to speech detectors detecting signal and noise of both the transmit and receive path, and to a level comparator comparing a signal representative of the envelope of the microphone speech signal of the near end subscriber unit and a signal representative of a far end subscriber's speech signal. At output side, the logic circuit controls a capacitor by charging or discharging the capacitor in dependence of the monitored signals at input side. In a typical example, in the receive mode when the far end gets the transmission channel because far end speech is detected with a signal strength greater than the near end, the capacitor is charged with a current of 10 $\mu$A, in the transmit mode when the near end gets the channel because near end speech is detected with a signal strength greater than the far end, the capacitor is discharged with a current of 10 $\mu$A, and in idle mode when neither speech is detected from the near end nor the far end, the capacitor is charged or discharged via a high Ohmic resistor forming a relatively large time constant with the capacitor. In this way, relatively fast switching is achieved between the far end and the near end when their speech signal is dominant while at the same time no nervous switching is done when neither far end nor near end carry speech signals. When using a short idling time this could lead to a nervous switching behaviour when the near or far end speech contains short pauses. The relatively large time constant causes an idling time in the order of a few seconds as compared to fast switching over times in the order of tens of milli-seconds. On page II-278, switching over behaviour of the voice switch is shown. As can be seen gain factors are adjusted smoothly when switching over from transmit mode to receive mode via idle mode and vice versa. On page II-266, an attenuator is shown in the transmit level input lead of a level comparator to an other input of which a receive level signal is fed. The attenuator is used so as to prevent that in the receive mode the acoustically fed back signal from the loudspeaker to the microphone would overrule the contribution of the far end talker. On the other hand the attenuator should not attenuate the transmit level input signal when the subscriber unit is in the transmit mode or in the idle mode. Although the known handsfree system operates satisfactorily for handsfree speaking distances of up to several meters, no proper functioning is obtained for larger distances of between 3 and 4 meters or even still larger distances of up to 7 meters. Such a condition occurs easily if the handsfree telephony functionality is integrated in a television set by including a telephony card in to the set, whereby the audio system of the set is used to implement an audio part of the receive path and to which a microphone is added. When using a television set in a living room a typical distance to a user is 3–4 meters whereas for set larger screens such a distance could increase to some 7 meters. For getting the same perceived signal levels, the gain in both the transmit path and the receive path should be increased. But then the switching range and the attenuation of the transmit level attenuator that is linked to the switching range should also be increased so as to keep the loop gain of the closed acoustical loop below one and to avoid that in the receive mode the fed back loudspeaker signal would erroneously put the near end subscriber unit in the transmit mode, respectively. For an ordinary handsfree telephone, the switching range typically is 20–30 dB. For a television set with integrated handsfree functionality, the switching range could be as high as 60 dB. For such a high switching range, a problem arises when the near end speaker wants to take over the conversion after the far end speaker has stopped speaking. In the receive mode the transmit level input of the level comparator is also attenuated by 60 dB. Due to this strong attenuation, the attenuated signal on the transmit level input will be weaker than the signal on the receive level input of the level comparator as a result of which the voice switch is switched to idle mode instead of being switched to the transmit mode. Although the attenuator in the transmit level input lead of the level comparator is switched off when the subscriber unit is switched to idle mode, because of the relatively long idling time of a few seconds, a few seconds of near end subscriber speech are lost at the far end subscriber side.

It is an object of the present invention to provide a telecommunications system of the above kind not having this drawback.

To this end the telecommunications system according to the present invention is characterized in that the duplex controller comprises switching over time reduction means for reducing a substantial increase in switching over time from the receive mode to the transmit mode caused by an increased switching range needed for preventing the near end subscriber unit from howling when used at a relatively large handsfree distance whereby increased amplifier gains are set in the near end subscriber unit, the switching over time reduction means being coupled to the signal detection means and the increase in switching over time being reduced if the signal detection means detects a speech signal in the transmit path and no speech signal in the receive path. It is achieved that no near end speech is lost at the far end when the subscriber unit switches from the receive mode to the transmit mode while at the same time the switching over remains smooth, i.e., no unnecessary switching is done if the far end speaker is silent for a while and the near end speaker does not (yet) take over the conversation.

In an embodiment of a telecommunications system according to the present invention, the control means comprises a capacitor and a voltage across the capacitor controls the voice switch, whereby a first voltage range corresponds to the receive mode, a second voltage range below the first voltage range corresponds to the transmit mode, and a third voltage range between the first and second range corresponds to the idle mode. Herewith, the voice switch can easily be controlled.

In a further embodiment of a telecommunications system according to the present invention, in the receive mode the capacitor is charged with a predetermined charging current, in the transmit mode the capacitor is discharged with a predetermined discharging current, in the idle mode the capacitor is charged with via a resistor forming a relatively large time constant with the capacitor, and the switching over time reduction means injects an additional but substantially smaller discharging current than the predetermined charging current into the capacitor if the signal detection means detect speech in the transmit path. Herewith, effectively the situation is obtained of detecting a speech signal in the transmit path and no speech signal in the receive path though no separate detection of the speech signal in the receive path is needed. This is because the difference between the charging current charging the capacitor when the far end subscriber is speaking and the injected current still is in the same order of the charging current when taken alone. A strong far end signal will thus put the near end subscriber unit in the receive mode while silence of the far end speaker and a detected speech signal in the receive path will cause the voice switch to skip the unwanted idle mode state (with the corresponding idling time of a few seconds).

Figure 2:
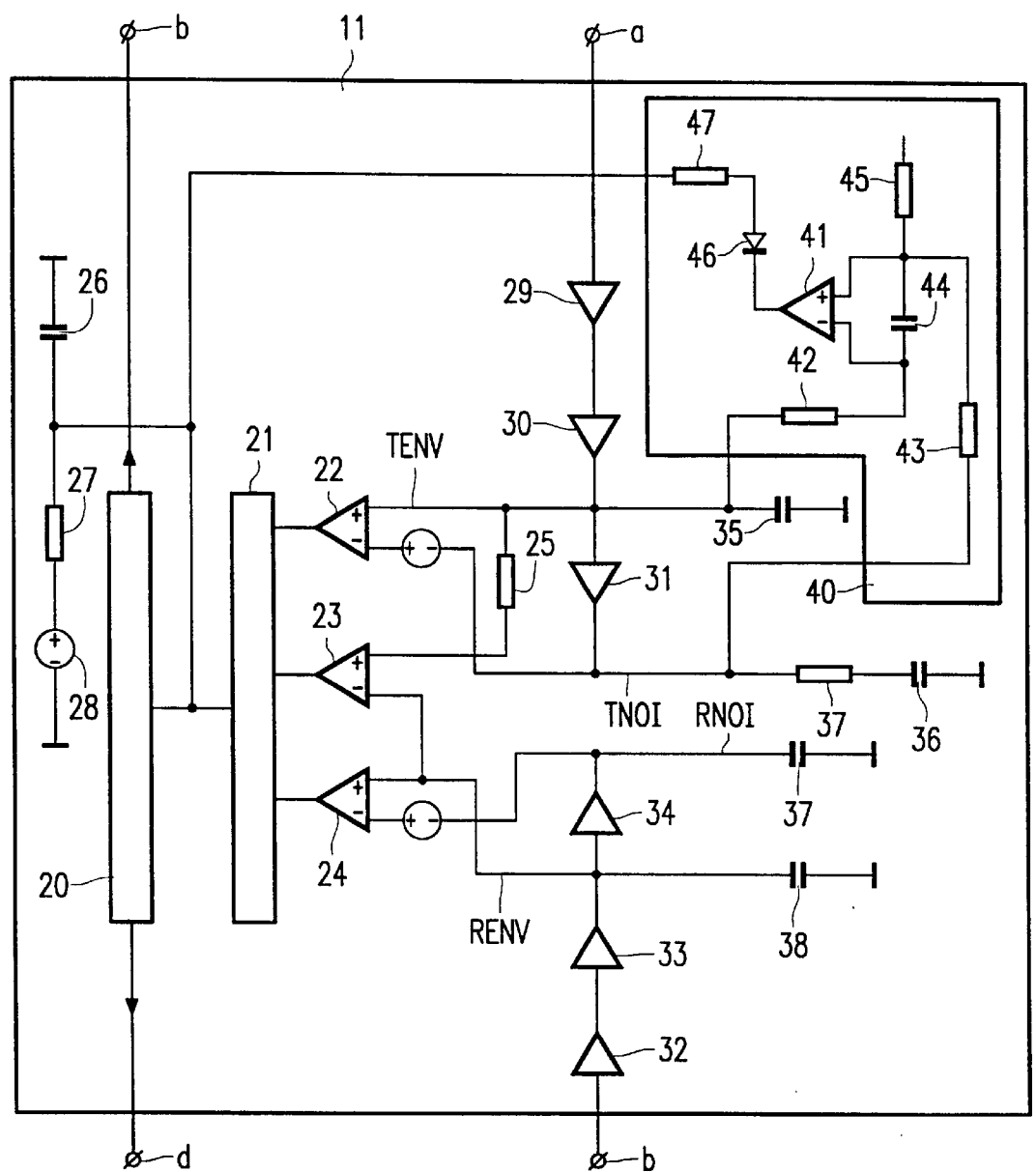

The present invention will now be described, by way of example, with reference to the accompanying drawings, wherein FIG. 1 schematically shows a telecommunications system according to the present invention, and FIG. 2 shows a duplex controller according to the present invention.

Throughout the figures the same reference numerals are used for the same features.

FIG. 1 schematically shows a telecommunications system 1 according to the present invention comprising a near end subscriber unit 2 and a far end subscriber unit 3 communicating with each other via a public switched telecommunication network PSTN, a private network, or the like. The near end subscriber unit 2 can be an ordinary handsfree telephone, a base station of a cordless telephone including handsfree functionality, a television set including handsfree telephony functionality, or the like. In case of a television set, telephony circuitry and a microphone 4 are included in the set, and audio functionality of the set is shared for amplifying telephony signals received from the far end subscriber set 3. The amplified signal is fed to a loudspeaker 5 included in the television set. A microcontroller in the television set (not shown in detail) is programmed to implement a suitable full screen or part-screen man-machine-interface for telephony. Such man-machine interfaces are well-known in the art. The near end subscriber unit 2 further comprises a transmit path 6 and a receive path 7. The transmit path 6 comprises the microphone 4 which is coupled to a microphone amplifier 8 and the receive path 7 comprises a loudspeaker amplifier 9 which is coupled to the loudspeaker 5. In a handsfree subscriber unit acoustic coupling occurs between the loudspeaker 5 and the microphone 4, indicated with an arrow 10. The microphone amplifier 8 and the loudspeaker amplifier 9 can be comprised in a TEA1094 integrated circuit, together with a duplex controller 11 controlling the microphone amplifier 8 and the loudspeaker amplifier 9. For a detailed description of the TEA1094-IC referred is to said Philips Applications Handbook 1995, "Wirebound telecom". The duplex controller 11 monitors signals in the transmit path 6 and in the receive path 7 and controls the amplifiers 8 and 9 accordingly. Generally speaking, the duplex controller 11 controls the loop gain of the closed loop formed by the microphone amplifier 8, a transmit amplifier 12, an anti side-tone network 13, a receiving amplifier 14, the loudspeaker amplifier 9 and the acoustic coupling 10 such that the loop gain is substantially smaller than one so as to prevent howling. The subscriber unit 2 can adopt three stable modes, a transmit mode in which the near end subscriber 'wins' when speaking, a receive mode in which the far end subscriber 'wins' when speaking and an idle mode in which neither subscriber is speaking. In transmit mode the duplex controller 11 controls the receiving amplifier 9 to minimum gain, in receive mode the transmit amplifier's gain is set to minimum, and in idle mode both amplifier's gains are reduced. The difference between the maximum gain and the minimum gain in either transmit or receive mode is the switching range. Terminals a, b, c, and d are shown for coupling the duplex controller to the transmit path 6, to the receive path 7, to the microphone amplifier 8, and to the loudspeaker amplifier 9.

FIG. 2 shows the duplex controller 11 according to the present invention comprising a voice switch 20 controlled by control means or logic 21. At an input side of the control means 21 output signals of a first speech detector 22, a level comparator 23, and a second speech detector 24 are provided. The first speech detector 22 detects speech in the transmit path 6 by comparing a signal representative of the microphone signal with a background noise signal, and the second speech detector 24 detects speech in the receive path 7 by means of a similar comparison. The level comparator 23 compares a signal representative of the microphone speech signal with a signal representative of the speech signal in the receive path 7. The comparator 23 indicates to the control means which signal 'wins'. In the receive mode an attenuator 25 is switched in a transmit signal input lead of the comparator 23. At an output side, the control means or logic 21 comprises switched current sources (not shown in detail but present in the TEA1094-IC) charging or discharging a capacitor 26 in the receive mode and the transmit mode, respectively, as described. In the idle mode, the capacitor 26 is charged via a resistor 27 to a reference voltage 28 having a value between a maximum value when the capacitor 26 is charged and a minimum value when the capacitor 26 is discharged. The duplex controller 11 comprises a series arrangement of a log-amplifier 29, a buffer 30, and a buffer 31. An output of the buffer 30 provides a transmit envelope signal TENV and an output of the buffer 31 provides a transmit noise signal TNOI, both fed to the first speech detector 22. The duplex controller 11 comprises a series arrangement of a log-amplifier 32, a buffer 33, and a buffer 34. An output of the buffer 33 provides a receive envelope signal RENV and an output of the buffer 34 provides a receive noise signal RNOI, both fed to the second speech detector 24. Further shown are adjustment capacitors 35, 36, 37, and 38, and an adjustment resistor 37. According to the present invention the duplex controller 11 further comprises switching over time reduction means 40 comprising a comparator 41 to which the signals TENV and TNOI are fed via resistors 42 and 43 comprised in the switching over time reduction means 40. The means 40 further comprises a capacitor 44, a resistor 45, a diode 46, and a resistor 47. The switching over time reduction means injects an additional but substantially smaller discharging current than the charging current injected by the control means 21 when in the receive mode into the capacitor 26 if the switching over time reduction means detect speech in the transmit path 6. The charging current injected by the control means typically is 10 $\mu$A and the additional discharging current typically is 1 $\mu$A. Herewith, when switching over from the receive mode to the transmit mode, as described, the capacitor 26 is quickly charged so that slow charging via the resistor 27 is overruled. If both speech at the far end and the near end is detected, then the remaining charging current is still 9 $\mu$A, more than enough to quickly charge the capacitor so that the receive mode is kept if the far end 'wins'. When no speech is detected at the near end, the voice switch 20 still switches slowly to the idle mode so as to prevent nervous switching.

We claim:

1. A telecommunications system comprising a near end subscriber unit arranged for handsfree communication with a far end subscriber unit via a transmission channel, at least the near end subscriber unit comprising a transmit path with a microphone and a microphone amplifier and a receive path with a loudspeaker amplifier and a loudspeaker, a duplex controller having signal detection means for detecting signals from the near and far end subscriber units, and a voice switch for switching over the near end subscriber unit to one of at least three operating modes including a transmit mode, a receive mode, and an idle mode, in dependence of output signals of the signal detection means, a receive path gain being reduced during the transmit mode, a transmit path gain being reduced during the receive mode, and both the transmit and receive path gains being reduced during the idle mode, whereby the near end subscriber unit further comprises control means for controlling the voice switch such that an idling time that the near end subscriber unit is in the idle mode is substantially greater than switching over times from the transmit or receive mode, the duplex controller comprising switching over time reduction means for reducing a substantial increase in switching over time from the receive mode to the transmit mode caused by an increased switching range needed for preventing the near end subscriber unit from howling when used at a relatively large handsfree distance whereby increased amplifier gains are set in the near end subscriber unit so as to perceive similar signal levels when the near end subscriber unit is used at a relatively short handsfree distance at lower amplifier gains, the switching over time reduction means being coupled to the signal detection means and the increase in switching over time being reduced if the signal detection means detect a speech signal in the transmit path and no speech signal in the receive path.

2. A telecommunications system according to claim 1, wherein the control means comprises a capacitor and a voltage across the capacitor controls the voice switch, whereby a first voltage range corresponds to the receive mode, a second voltage range below the first voltage range corresponds to the transmit mode, and a third voltage range between the first and second range corresponds to the idle mode.

3. A telecommunications system according to claim 2, wherein in the receive mode the capacitor is charged with a predetermined charging current, in the transmit mode the capacitor is discharged with a predetermined discharging current, in the idle mode the capacitor is charged with via a resistor forming a relatively large time constant with the capacitor, and the switching over time reduction means injects an additional but substantially smaller discharging current than the predetermined charging current into the capacitor if the signal detection means detect speech in the transmit path.

4. A near end subscriber unit for use in a telecommunications system, which near end subscriber unit is arranged for handsfree communication with a far end subscriber unit in the telecommunications system via a transmission channel and which near end subscriber unit comprises a transmit path with a microphone and a microphone amplifier and a receive path with a loudspeaker amplifier and a loudspeaker, a duplex controller having signal detection means for detecting signals from the near and far end subscriber units, and a voice switch for switching over the subscriber unit to one of at least three operating modes including a transmit mode, a receive mode, and an idle mode, in dependence of output signals of the signal detection means, a receive path gain being reduced during the transmit mode, a transmit path gain being reduced during the receive mode, and both the transmit and receive path gains being reduced during the idle mode, whereby the near end subscriber unit further comprises control means for controlling the voice switch such that an idling time that the near end subscriber unit is in the idle mode is substantially greater than switching over times from the transmit or receive mode, the duplex controller comprising switching over time reduction means for reducing a substantial increase in switching over time from the receive mode to the transmit mode caused by an increased switching range needed for preventing the near end subscriber unit from howling when used at a relatively large handsfree distance whereby increased amplifier gains are set in the near end subscriber unit so as to perceive similar signal levels when the near end subscriber unit is used at a relatively short handsfree distance at lower amplifier gains, the switching over time means being coupled to the signal detection means and the increase in switching over time being reduced if the signal detection means detect a speech signal in the transmit path and no speech signal in the receive path.

5. A television set comprising a near end subscriber unit as claimed in claim 4, a set's audio system being used as an audio part of the receive path.

6. A near end subscriber unit for use in a telecommunication system having a far end subscriber unit with which the near end subscriber is configured to have a handsfree communication via a transmission channel, said near end subscriber unit comprising:

- a transmit path with a microphone and a microphone amplifier,
- a receive path with a loudspeaker amplifier and a loudspeaker,
- a duplex controller for controlling the receive path and the transmit path,
- the duplex controller having signal detection means for detecting signals from the near and far end subscriber units, a voice switch for switching over the near end subscriber unit to one of at least three operating modes including a transmit mode, a receive mode, and an idle mode, in dependence of output signals of the signal detection means, control means for controlling the voice switch such that an idling time that the near end subscriber unit is in the idle mode is substantially greater than switching over times from the transmit or the receive mode, and switching over time reduction means for reducing a substantial increase in switching over time from the receive mode to the transmit mode caused by an increased switching range of gains in the transmit path needed for preventing the near end subscriber unit from howling when used at a relatively large handsfree distance whereby increased amplifier gains are set in the near end subscriber unit so as to perceive similar signal levels when the near end subscriber unit is used at a relatively short handsfree distance at lower amplifier gains, the switching over time reduction means being coupled to the detection means, and the switching over time reduction means being configured for reducing the increase in switching over time if the signal detect meas detect a speech signal in the transmit path and no signal in the receive path.

* * * * *